United States Patent
Tamura

(10) Patent No.: US 8,116,802 B2
(45) Date of Patent: Feb. 14, 2012

(54) TRANSMISSION POWER CONTROL SYSTEM, METHOD THEREFOR, AND BASE STATION AND MOBILE COMMUNICATION TERMINAL THAT ARE USED THEREIN

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 12/279,365

(22) PCT Filed: Feb. 1, 2007

(86) PCT No.: PCT/JP2007/000048
§ 371 (c)(1),
(2), (4) Date: Aug. 14, 2008

(87) PCT Pub. No.: WO2007/094128
PCT Pub. Date: Aug. 23, 2007

(65) Prior Publication Data
US 2009/0054019 A1 Feb. 26, 2009

(30) Foreign Application Priority Data
Feb. 15, 2006 (JP) .................................. 2006-037319

(51) Int. Cl.
*H04B 7/00* (2006.01)
(52) U.S. Cl. ........................................ 455/522; 370/318
(58) Field of Classification Search .................... 455/69, 455/522; 370/318
See application file for complete search history.

(56) References Cited

U.S. PATENT DOCUMENTS

| 6,862,447 B1* | 3/2005 | Solondz ......................... 455/423 |
| 7,724,768 B2* | 5/2010 | Carlsson et al. .............. 370/465 |
| 2003/0017837 A1* | 1/2003 | Kalliojarvi .................... 455/522 |
| 2004/0202104 A1* | 10/2004 | Ishii et al. ..................... 370/225 |

FOREIGN PATENT DOCUMENTS

| JP | 2002261687 A | 9/2002 |
| JP | 2005167963 A | 6/2005 |
| WO | 2005062490 A | 7/2005 |

OTHER PUBLICATIONS

Chinese Office Action for CN200780005604.3 issued Aug. 25, 2011.

* cited by examiner

*Primary Examiner* — Raymond Dean

(57) ABSTRACT

HS-SCCH transmission power is controlled on a transmitting side depending on whether HS-DSCH transmission is to be executed, so as to maintain total reception power on a receiving side at a constant level. More specifically, the HS-SCCH transmission power of P2 is transmitted in the case where the HS-DSCH transmission is not to be executed, while the HS-SCCH transmission power is controlled to be $P1=P2-\Delta P$, in the case where the HS-DSCH transmission is to be executed, which increases the power by $\Delta P$. Accordingly, the total power on the receiving side remains unchanged regardless of whether the HS-DSCH transmission is to be executed, and hence the AGC function on the receiving side is kept from saturation, which allows preventing a receiving error.

20 Claims, 10 Drawing Sheets

TRANSMISSION POWER CONTROL SYSTEM, METHOD THEREFOR, AND BASE STATION AND MOBILE COMMUNICATION TERMINAL THAT ARE USED THEREIN

TECHNICAL FIELD

The present invention relates to a transmission power control system and a method therefore, and a base station and a mobile communication terminal that are used therein, and more particularly to a transmission power control system employed in a mobile communication system based on the High Speed Downlink Packet Access (hereinafter, HSDPA) mode.

BACKGROUND ART

Under the Code Division Multiple Access (CDMA) mobile communication mode, conventionally, transmission and reception are performed under a lowered diffusion rate, as a method for executing data communication at a high speed. This leads to lowered diffusion gain which often incurs signal degradation, and hence the data channel requires a high power.

Also, the HSDPA format, expected to be put to practical use in future, employs 16QAM modulation for achieving data communication at an even higher speed, which requires a higher channel power than in the current system which employs QPSK modulation.

Here, the HSDPA refers to a data transmission mode that employs the High Speed-Physical Downlink Shared Channel (hereinafter, HS-PDSCH), which offers a faster downstream transmission speed.

Under the HSDPA mode, data is not constantly transmitted, and reception power suddenly increases (+ΔP) when the data emerges as shown in a fluctuation example of downstream reception power of FIG. 10, when seen from the receiving terminal side.

Accordingly, the Auto Gain Control (hereinafter, AGC) is unable to follow up and the level of the received signal is saturated, and hence a receiving error is incurred. If such receiving error is always incurred upon starting up the HS-PDSCH transmission the throughput is degraded, and therefore some measures have to be taken.

In FIG. 10, the High Speed-Shared Control Channel (hereinafter, HS-SCCH) is a channel for transmitting control information therethrough to a mobile communication terminal. The Common Pilot Channel (hereinafter, CPICH) is a channel for a common pilot. The Primary Common Control Physical Channel (PCCPCH) is a first common control physical channel.

Meanwhile, a technique has been proposed that controls, in the HSDPA mode, a total sum of the power required by all the channels for transmission from a base station to a mobile communication terminal, to be constant. The technique is intended for preventing fluctuation of interference power with respect to another user, arising from the fluctuation of the downstream transmission power.

More specifically, the technique includes controlling the HS-PDSCH transmission power so as to maintain the total sum of the power for the CPICH, the Dedicated Physical Channel (hereinafter, DPCH), and the HS-PDSCH at a constant level (for example, refer to patented document 1).
[Patent document 1] JP-A No. 2002-261687

DISCLOSURE OF THE INVENTION

Problems to be Solved by the Invention

As shown in FIG. 10, under the conventional mode, the downstream reception power sharply increases by ΔP when a state where communication data is absent turns to a state where communication data is present. This leads to the drawback that the AGC function on the side of the mobile communication terminal is unable to follow up, thereby incurring a receiving error.

Besides, the technique according to the patented document 1 constantly controls the HS-PDSCH power under the state where communication data is present, to thereby maintain the downstream transmission power at a constant level, and is not intended for handling the transmission power when the state where communication data is absent turns to a state where communication data is present. Accordingly, the foregoing receiving error arising from the disability of the AGC to follow up still cannot be prevented.

An object of the present invention is to provide a transmission power control system capable of maintaining a total reception power on the side of a receiving terminal at a constant level, thereby preventing degradation in receiving characteristic because of AGC saturation and achieving a desirable receiving characteristic, and a method therefore, and a base station and a mobile communication terminal that are used therein.

Means for Solving the Problem

According to the present invention, there is provided a transmission power control system for a HSDPA mode mobile communication system, comprising a device that controls, depending on whether a signal is present in a downstream shared channel, a transmission power of another downstream channel at a base station, to thereby maintain a total downstream power at a generally constant level.

According to the present invention, there is provided a method of controlling a transmission power for a HSDPA mode mobile communication system, comprising controlling, depending on whether a signal is present in a downstream shared channel, a transmission power of another downstream channel at a base station, to thereby maintain a total downstream power at a generally constant level.

According to the present invention, there is provided a base station for a HSDPA mode mobile communication system, comprising a device that controls, depending on whether a signal is present in a downstream shared channel, a transmission power of another downstream channel, to thereby maintain a total downstream power at a generally constant level.

According to the present invention, there is provided a mobile communication terminal for a HSDPA mode mobile communication system, comprising a device that controls a gain of an AGC function depending on whether a signal assigned to the mobile communication terminal is present in a downstream shared channel.

According to the present invention, there is provided a program that causes a computer to execute a transmission power control operation of a base station in a HSDPA mode mobile communication system, comprising controlling, depending on whether a signal is present in a downstream shared channel, the transmission power of another downstream channel, to thereby maintain a total downstream power at a generally constant level.

According to the present invention, there is provided another program that causes a computer to control an action of a mobile communication terminal in a HSDPA mode mobile communication system, comprising controlling a gain of an AGC function depending on whether a signal assigned to the mobile communication terminal is present in a downstream shared channel.

Effects of the Invention

The present invention offers the following advantageous effects. A first effect of the present invention is that the downstream transmission power is controlled such that the total power at the receiving terminal is maintained constant before and after the high speed data channel communication, so as to prevent degradation of the received signal because of AGC saturation, and that thus a desirable receiving characteristic can be secured. Also, a second effect of the present invention is that, in the foregoing control, the HS-SCCH transmission power, which is of a low speed rate and less susceptible to signal degradation, is controlled so as to maintain the total power at the receiving terminal, and that thus a desirable receiving characteristic can be maintained.

BRIEF DESCRIPTION OF THE DRAWINGS

The above and other objects, features and advantages will become more apparent from the preferred embodiments described below and the accompanying drawings, in which.

BEST MODE FOR CARRYING OUT THE INVENTION

Figure 1:
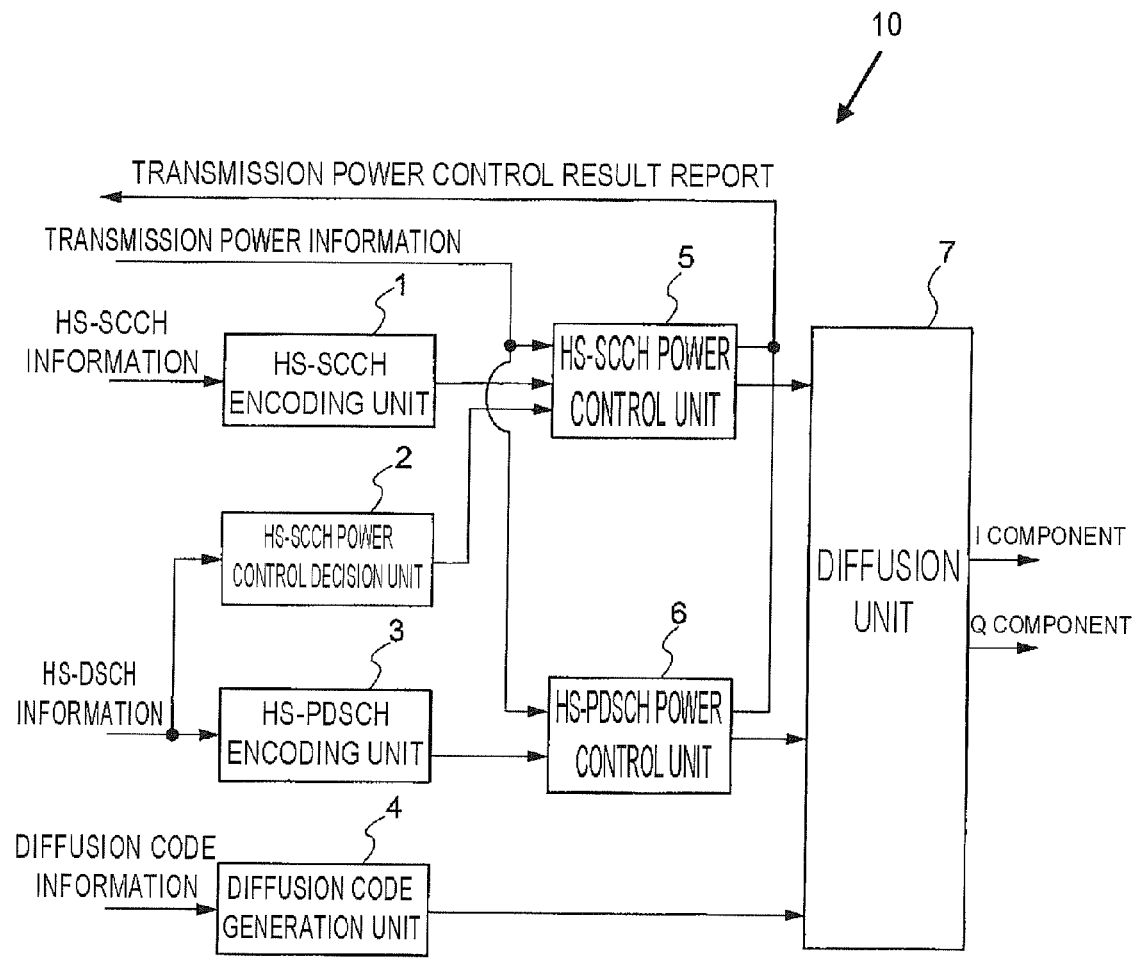
FIG. 1 is a functional block diagram of a transmitting side (base station side) of a mobile communication system according to an embodiment of the present invention.

Hereunder, an embodiment of the present invention will be described referring to FIGS. 1 to 4. FIG. 1 is a functional block diagram of a base station according to the embodiment of the present invention, and shows a circuit configuration for controlling the HSDPA transmission and reception.

Figure 2:
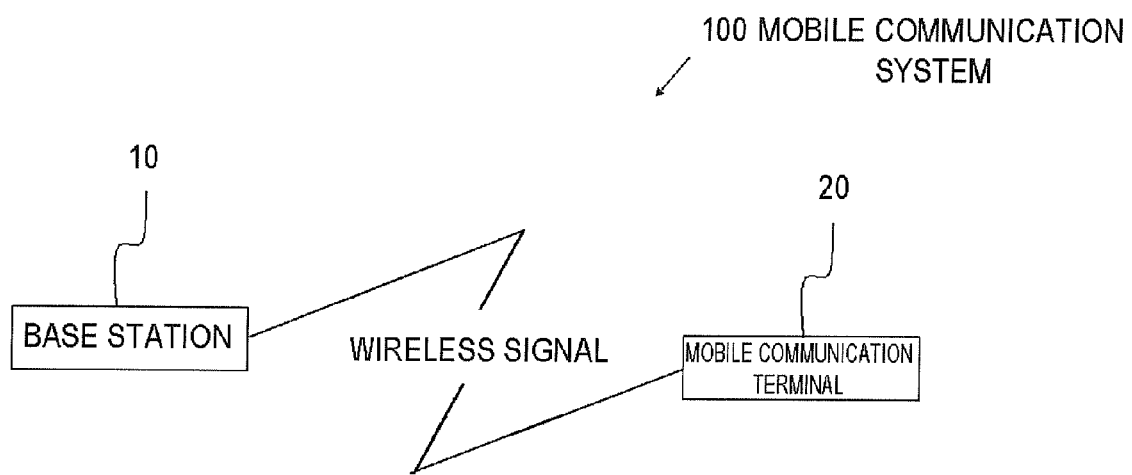
FIG. 2 is a schematic diagram showing a relationship between the base station and a mobile communication terminal in the mobile communication system according to the embodiment of the present invention.

A mobile communication system 100 according to this embodiment includes, as shown in FIG. 2, a base station 10 that transmits a wireless signal, and a mobile communication terminal 20 that receives the wireless signal. The mobile communication terminal 20 includes an AGC unit that automatically adjusts a gain according to the reception power of the wireless signal.

The base station 10 includes a device that controls the transmission power of the wireless signal containing therein at least a first channel where signals are constantly generated and a second channel where signals are sporadically generated, to be generally constant.

More specifically, the base station 10 according to this embodiment includes, as the transmission power control system being the foregoing device which maintains the transmission power of the wireless signal generally constant, a HS-SCCH power control decision unit 2, a HS-SCCH power control unit 5, and a HS-PDSCH power control unit 6.

As shown in FIG. 1, the HS-SCCH encoding unit 1 executes an encoding process with respect to HS-SCCH information given by an upper level, to be converted into a signal for the first channel. Likewise, the HS-PDSCH encoding unit 3 executes an encoding process with respect to HS-DSCH information given by the upper level, to be converted into a signal for the second channel.

The outputs from the HS-SCCH encoding unit 1 and the HS-PDSCH encoding unit 3 are subjected to transmission power control by the HS-SCCH power control unit 5 and the HS-PDSCH power control unit 6, respectively.

The HS-SCCH data and the HS-PDSCH data that have undergone the power control are diffused in a diffusion unit 7 based on a diffusion code output from a diffusion code generation unit 4. Details of the foregoing respective processing are stipulated as specifications according to the 3rd Generation Partnership Project (3GPP) standardization, and hence known in the art.

According to the present invention, the HS-SCCH power control decision unit 2 decides whether the HS-PDSCH transmission is to be executed, based on the HS-DSCH information, to thereby control the HS-SCCH power control unit 5 such that, in the case where the HS-PDSCH transmission is not executed, the increment of the transmission power because of the HS-PDSCH transmission is compensated with the HS-SCCH transmission power.

Now, the power control operation according to the present invention, executed by the HS-SCCH power control decision unit 2 and the HS-SCCH power control unit 5 shown in FIG. 1, will be described utilizing the flowchart shown in FIG. 3, as well as the characteristic diagrams showing fluctuation with time of the transmission power shown in FIGS. 4 and 5.

Figure 3:
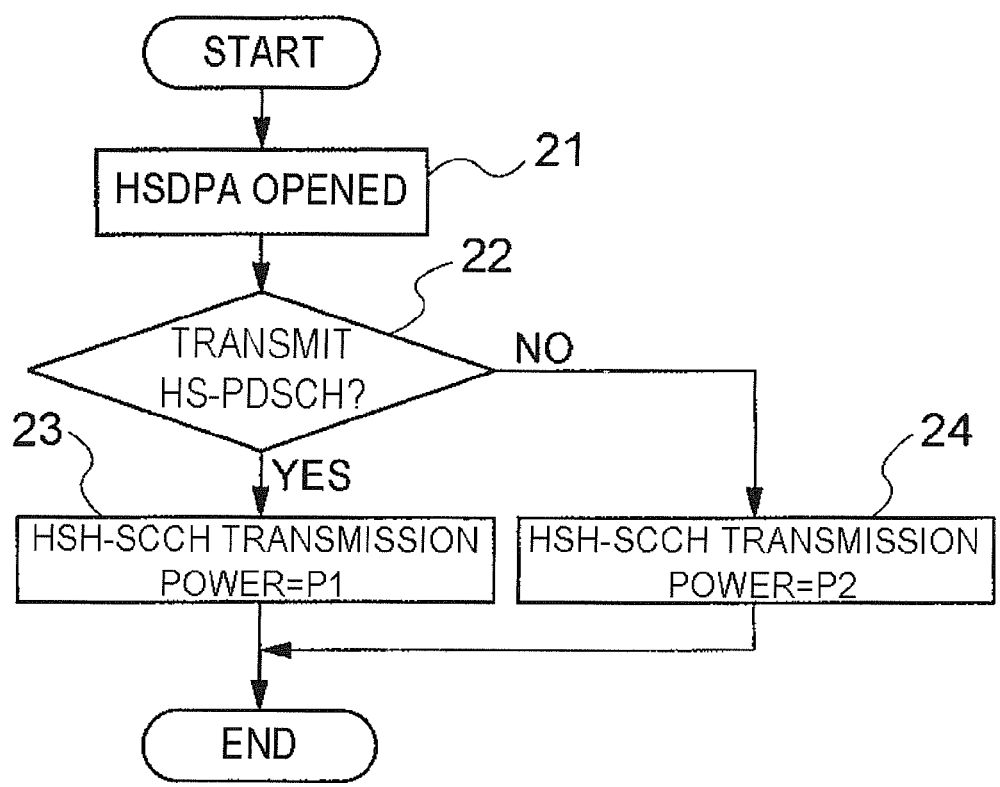
FIG. 3 is a flowchart showing an operation of the base station.

To control the HSDPA power according to this embodiment, firstly the HS-SCCH power control decision unit 2 confirms whether the HS-PDSCH transmission is to be executed, based on the HS-DSCH information given by the upper level (step 21, 22 in FIG. 3).

The HS-SCCH power control decision unit 2 controls the HS-SCCH power control unit 5 so as to attain a HS-SCCH transmission power ratio designated by the upper level, in the case where the HS-PDSCH transmission is to be executed (YES at step 22 in FIG. 3). In this case, the HS-SCCH power control unit 5 decides the HS-SCCH transmission power to be as P1 shown in FIG. 4 (step 23 in FIG. 3).

In the case where the HS-PDSCH transmission is not to be executed (NO at step 22 in FIG. 3), the HS-SCCH power control unit 5 is controlled so as to compensate the increment of the transmission power that would be attained with the HS-PDSCH transmission, with the HS-SCCH transmission power. In this case, the HS-SCCH power control unit 5 decides the HS-SCCH transmission power to be as P2 in FIG. 4 (step 24 in FIG. 3).

Figure 10:
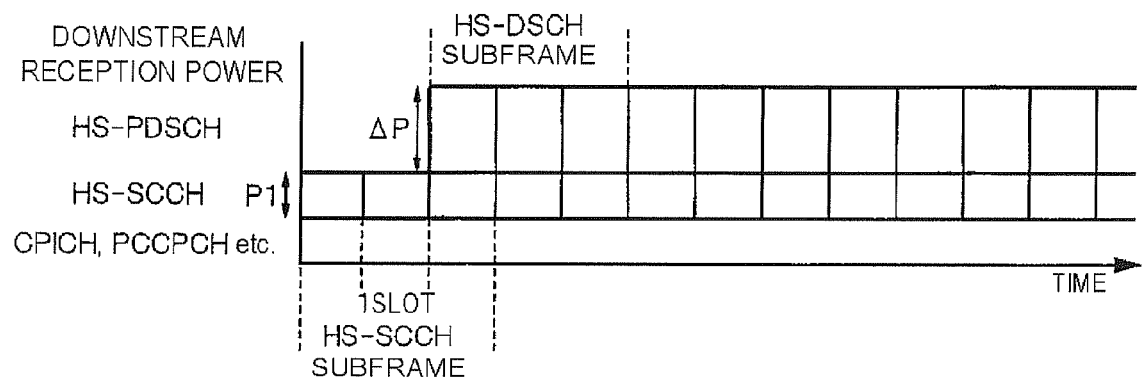
FIG. 10 is a characteristic diagram showing fluctuation with time of a downstream reception power of a wireless signal transmitted from a base station and received by a mobile communication terminal, in a conventional mobile communication system.

The HS-SCCH power control unit 5 receives in advance a notice of the increment of the transmission power because of the HS-PDSCH transmission (ΔP in FIG. 10), based on the transmission power information from the upper level, and decides that the HS-SCCH transmission power becomes P2 (=P1+ΔP) in the case where the HS-SCCH power control decision unit 2 issues an instruction to control the power, and reports to the upper level to the effect that the power control has been executed at a baseband processing unit.

The controlling procedure to maintain the reception power constant before and after the HS-PDSCH transmission with the HS-SCCH transmission power has been described as above. However, the present invention is not limited to the foregoing mode, and it suffices that the transmission power for the first channel where signals are constantly generated can compensate the fluctuation of the transmission power originating from the sporadic generation of signals in the second channel.

Figure 4:
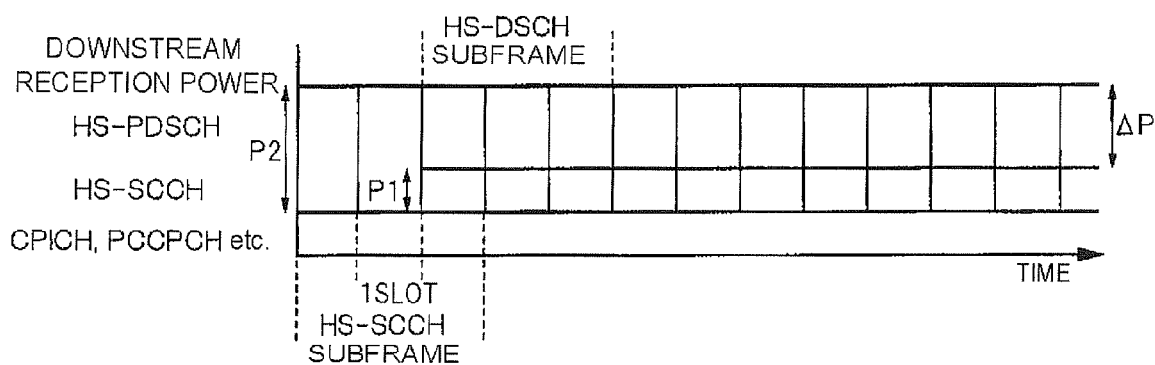
FIG. 4 is a characteristic diagram showing fluctuation with time of a downstream reception power of a wireless signal transmitted from the base station and received by the mobile communication terminal.
Figure 5:
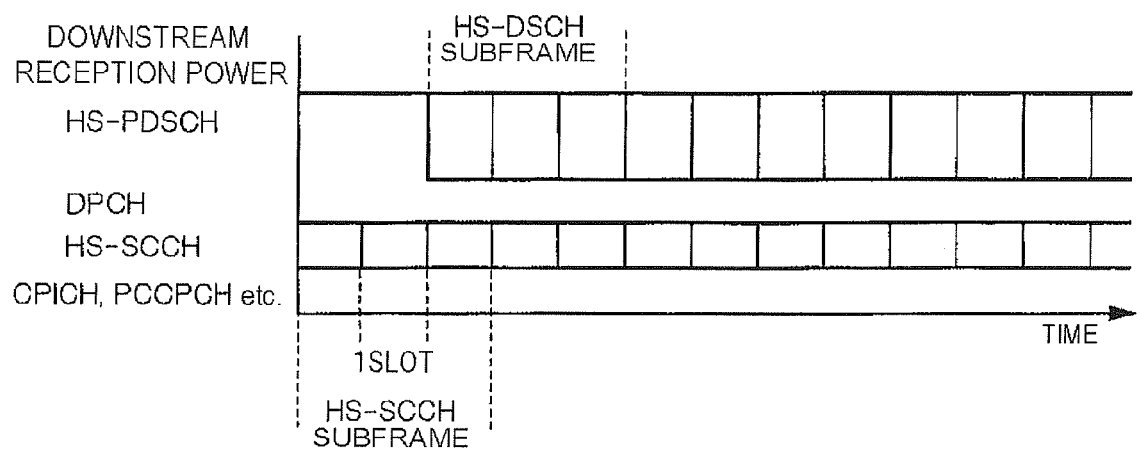
FIG. 5 is a characteristic diagram showing fluctuation with time of a downstream reception power according to a variation.
Figure 6:
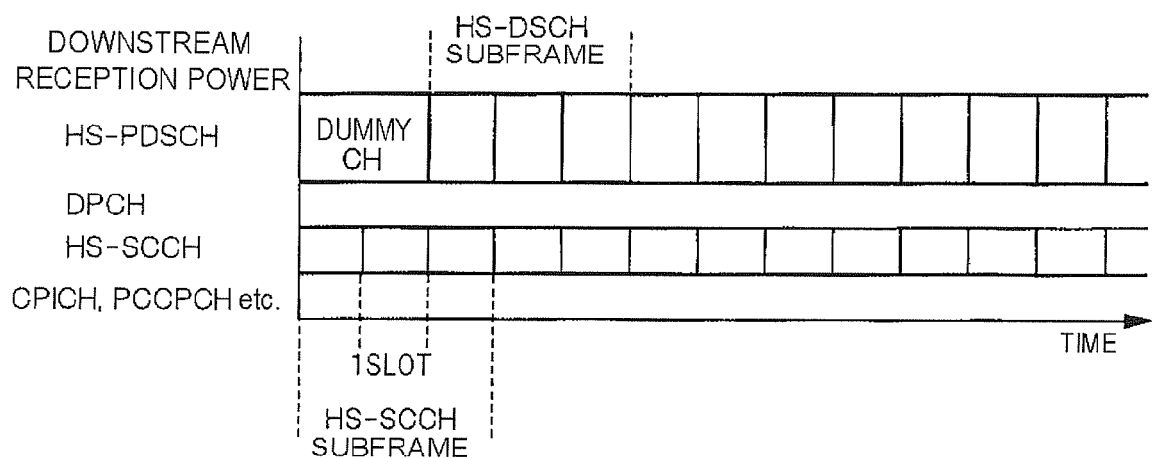
FIG. 6 is a characteristic diagram showing fluctuation with time of a downstream reception power according to another variation.

For such purpose, the transmission power of a downstream DPCH may be controlled to fluctuate as the first channel power as shown in FIG. 5, instead of controlling the HS-SCCH transmission power as shown in FIG. 4. Also, as shown in FIG. 6, a dummy channel power not employed for communication may be controlled as the first channel power.

Also, it is not mandatory that ΔP equals to P2-P1. Adding an offset to the power control amount for alleviating the influence of the HS-SCCH signal degradation can also provide a similar effect to that attained by the foregoing embodiment.

In other words, the following may also be established:

$$\Delta P = P2 - P1 \pm m \text{ (}m\text{: offset value, which should be positive)}$$

Further, the foregoing embodiment and variations show an example where the transmission power of the wireless signal can be maintained at a generally constant level, by increasing or decreasing the transmission power of the HS-SCCH and so forth so as to compensate the HS-PDSCH transmission power which is sporadically provided.

However, instead of maintaining the transmission power of the wireless signal generally constant, restraining the fluctuation speed of the transmission power of the wireless signal so as to enable the AGC function of the mobile communication terminal 20 to follow up can also prevent the receiving error of the AGC function.

For example, the transmission power of the HS-SCCH and so on may be sequentially increased, immediately before a signal is generated in the HS-PDSCH. To be more detailed, based on the HSDPA specification according to the 3GPP, it can be decided at the time of the HS-SCCH subframe transmission whether transmission data is present in the HS-PDSCH subframe, which is two slots later.

Figure 7:
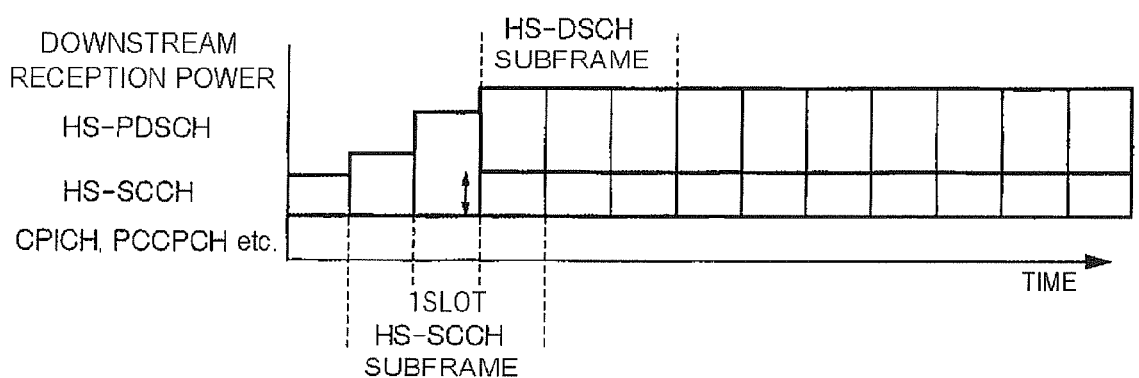
FIG. 7 is a characteristic diagram showing fluctuation with time of a downstream reception power according to still another variation.

Accordingly, as shown in FIG. 7, the HS-SCCH transmission power may be sequentially increased by slot, without limitation to the type of the channel utilized for the power control, so as to execute what is known as a ramp-up control. This is also effective for preventing a sharp increase in transmission power, which takes place upon starting up the power control.

The foregoing embodiments have described the procedures on the transmitting side (the side of the base station 10) for controlling the transmission power control. However, it is also possible to prevent the receiving error of the AGC function on the receiving side (the side of the mobile communication terminal 20).

Figure 8:
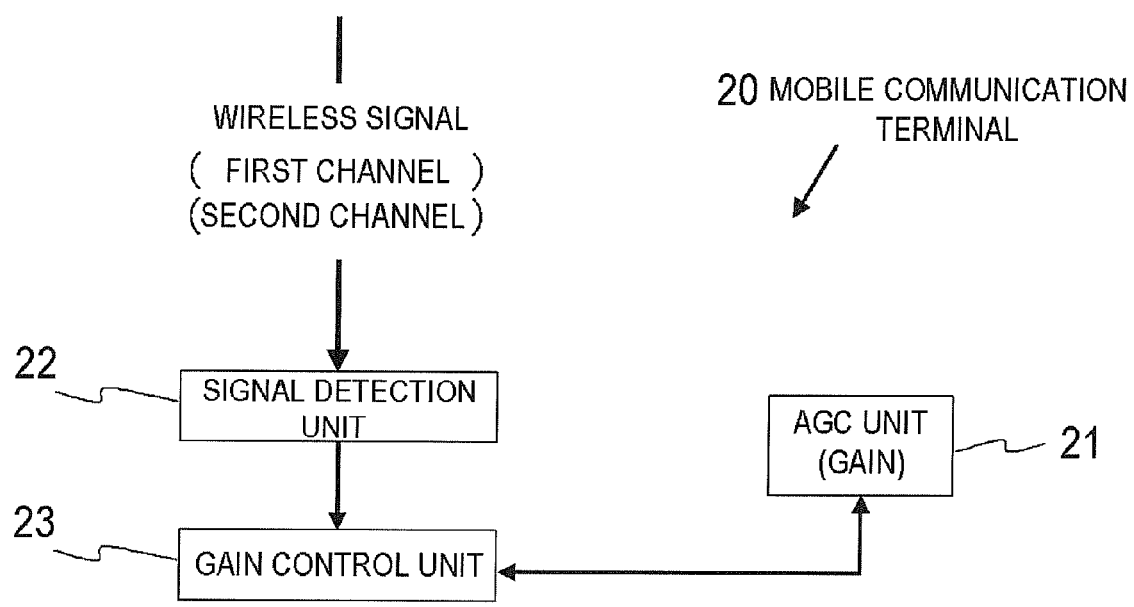
FIG. 8 is a schematic block diagram showing an important portion of a mobile communication terminal according to still another variation.

For example, the mobile communication terminal 20 shown in FIG. 8 includes an AGC unit 21 that automatically adjusts a gain according to the reception power of the wireless signal, a signal detection unit 22 that detects in advance the signal generation in the second channel, based on the signal generated in the first channel from the wireless signal received, and a gain control unit 23 that temporarily lowers the gain of the AGC unit 21 when the signal is generated in the second channel.

In other words, on the receiving side (the side of the mobile communication terminal 20), based on the HSDPA specification according to the 3GPP, it can be decided upon receipt of the first slot of the HS-SCCH subframe whether transmission data assigned to the mobile communication terminal 20 is present in the immediately subsequent HS-PDSCH subframe.

Figure 9:
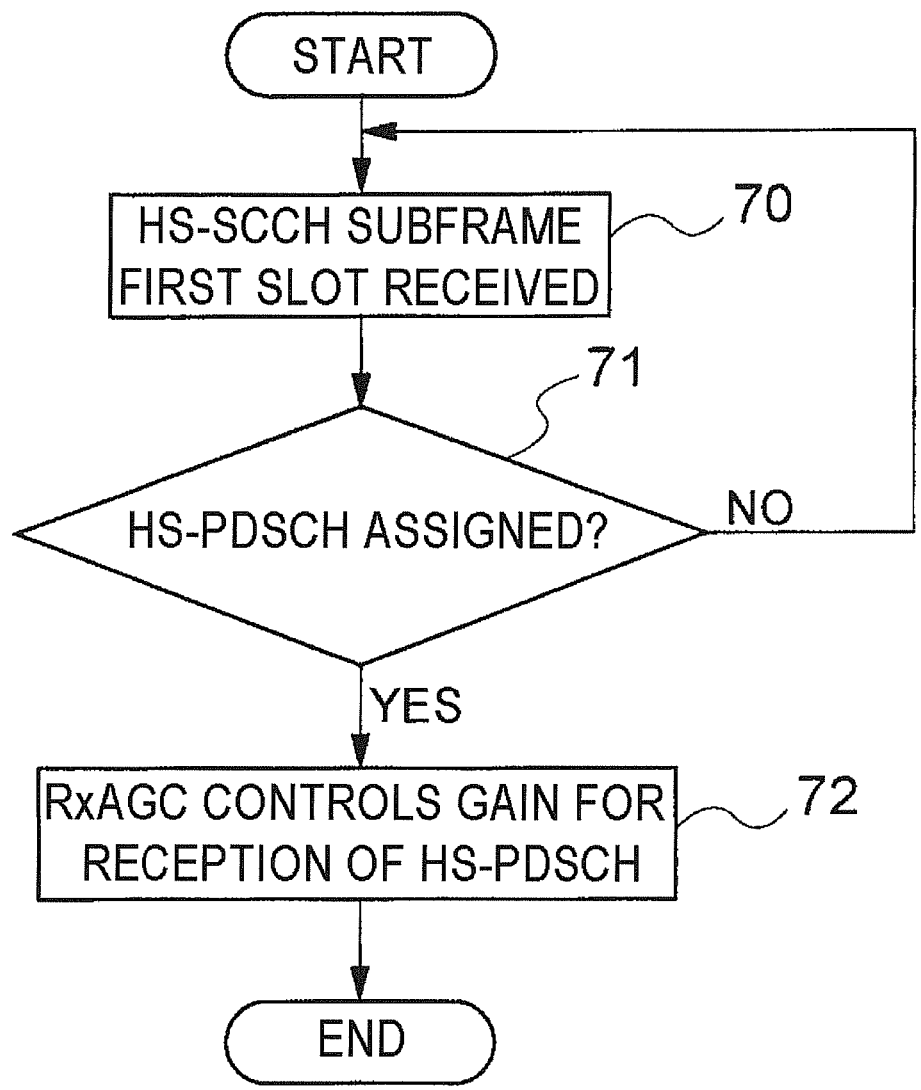
FIG. 9 is a flowchart showing an operation of the mobile communication terminal.

Accordingly, temporarily lowering the gain value at the AGC on the receiving side (RxAGC) before the reception by the HS-PDSCH allows preventing the receiving error arising from the AGC saturation, as in the foregoing embodiment. Referring to the flowchart in FIG. 9, the procedures taken on the receiving side in this case will be described.

The receiving side keeps receiving the HS-SCCH once the HSDPA is opened (set), and decodes the first slot of the HS-SCCH subframe (step 70).

In the case where it is decided that, upon decoding, the HS-SCCH assigned to the mobile communication terminal is present, in other words, that the data assigned to the mobile communication terminal is present in the immediately subsequent HS-PDSCH subframe (step 71), it is assumed that the total reception power is to increase two slots later from the HS-SCCH subframe where the data has been received, and the gain value is adjusted at the RxAGC (step 72). Here, the adjustment refers to lowering the gain value so as to avoid saturation despite receiving a high power.

Further, the foregoing embodiment is based on the assumption that the functions of the base station 10 and of the mobile communication terminal 20 are performed by the respective exclusive hardware. However, a part or all of the foregoing functions may be provided in a form of a computer program to the base station 10 or the mobile communication terminal 20, or realized by a combination of the hardware and the computer program.

For example, it suffices that the computer program of the base station 10 is written so as to cause the base station 10 to control, for example, the transmission power of the wireless signal containing therein at least the first channel such as the HS-SCCH where signals are constantly generated and the second channel such as the HS-PDSCH where signals are sporadically generated, to be generally constant.

Also, it suffices that the computer program of the mobile communication terminal 20 is written so as to cause the mobile communication terminal 20 to, for example, detect in advance the signal generation in the second channel such as the HS-PDSCH, based on the signal in the first channel such as the HS-SCCH from the received wireless signal, and to temporarily lower the gain of the AGC unit 21 when the signal is generated in the second channel.

Further, the foregoing embodiment represents an example where the wireless signal is transmitted under the HSDPA mode. However, the present invention is applicable to various types of wireless signals, provided that the wireless signal contains therein the first channel where signals are constantly generated and the second channel where signals are sporadically generated.

What is claimed is:

1. A transmission power control system for a HSDPA mode mobile communication system, comprising:
a device that temporarily and sequentially increases, before a signal is present in a downstream shared channel, a transmission power of another downstream channel at a base station.

2. The transmission power control system according to claim 1, wherein said another downstream channel is a HS-SCCH.

3. The transmission power control system according to claim 1, wherein said another downstream channel is a DPCH.

4. The transmission power control system according to claim 1, wherein said another downstream channel is a dummy channel.

5. A method of controlling transmission power for a HSDPA mode mobile communication system, comprising:
temporarily and sequentially increasing, before a signal is present in a downstream shared channel, a transmission power of another downstream channel at a base station.

6. The method according to claim 5, wherein said another downstream channel is a HS-SCCH.

7. The method according to claim 5, wherein said another downstream channel is a DPCH.

8. The method according to claim 5, wherein said another downstream channel is a dummy channel.

9. A base station for a HSDPA mode mobile communication system, comprising a device that temporarily and sequentially increases, before a signal is present in a downstream shared channel, a transmission power of another downstream channel.

10. The base station according to claim 9, wherein said another downstream channel is a HS-SCCH.

11. The base station according to claim 9, wherein said another downstream channel is a DPCH.

12. The base station according to claim 9, wherein said another downstream channel is a dummy channel.

13. A non-transitory computer-readable storage medium storing a program for causing a computer to execute a transmission power control operation of a base station in a HSDPA mode mobile communication system, comprising:
temporarily and sequentially increasing, before a signal is present in a downstream shared channel, said transmission power of another downstream channel.

14. A mobile communication system including a base station that transmits a wireless signal containing therein at least a first channel where signals are constantly present and a second channel where signals are sporadically present and a mobile communication terminal that receives said wireless signal,
wherein said mobile communication terminal includes an AGC unit that automatically adjusts a gain according to a reception power of said wireless signal; and
said base station includes a device that temporarily and sequentially increases a transmission power of said first channel where the signals are constantly present, before a signal is present in said second channel.

15. A mobile communication system including a base station that transmits a wireless signal and a mobile communication terminal that receives said wireless signal,
wherein said mobile communication terminal includes an AGC unit that automatically adjusts a gain according to a reception power of said wireless signal; and
said base station includes a device that restrains fluctuation speed of a transmission power of said wireless signal according to follow-up performance of said AGC unit, said wireless signal containing therein at least a first channel where signals are constantly generated and a second channel where signals are sporadically generated.

16. The mobile communication system according to claim 15, wherein said device temporarily and sequentially increases said transmission power for said first channel, immediately before generation of said signal in said second channel.

17. The mobile communication system according to claim 14, wherein said base station transmits said wireless signal of a HSDPA mode, and said first channel is constituted of a HS-PDSCH.

18. A base station that transmits a wireless signal to be received by a mobile communication terminal, said wireless signal containing therein at least a first channel where signals are constantly present and a second channel where signals are sporadically present, said base station comprising:
a device that temporarily and sequentially increases a transmission power of said first channel where the signals are constantly generated before a signal is present in said second channel.

19. A base station that transmits a wireless signal to be received by a mobile communication terminal, comprising:
a device that restrains fluctuation speed of transmission power of said wireless signal according to follow-up performance of an AGC unit included in said mobile communication terminal, said AGC unit automatically adjusting a gain according to a reception power of said wireless signal in said mobile communication terminal, said wireless signal containing therein at least a first channel where signals are constantly generated and a second channel where signals are sporadically generated.

20. A non-transitory computer-readable storage medium storing a computer program for causing a base station that transmits a wireless signal to be received by a mobile communication terminal to execute a transmission power control, comprising:
controlling a transmission power of said wireless signal containing therein at least a first channel where signals are constantly generated and a second channel where signals are sporadically generated, to temporarily and sequentially increase a transmission power of the first channel where the signals are constantly generated before a signal is present in said second channel.

* * * * *